Oct. 10, 1939. E. R. THOMAS 2,175,651
SURFACE ROD LINE JACK
Filed Jan. 25, 1938 3 Sheets-Sheet 3
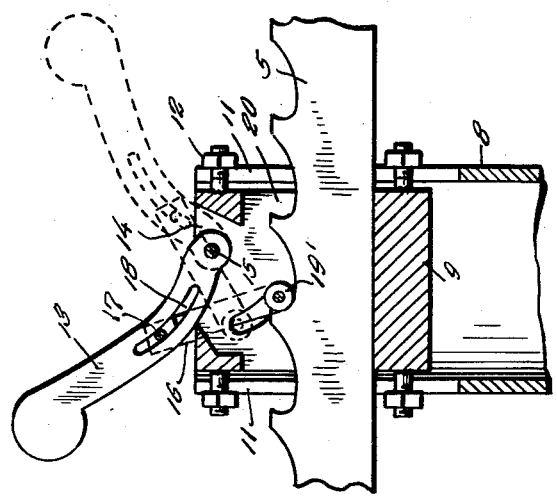
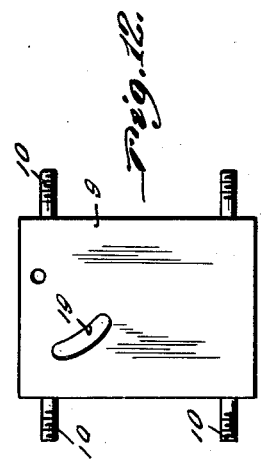
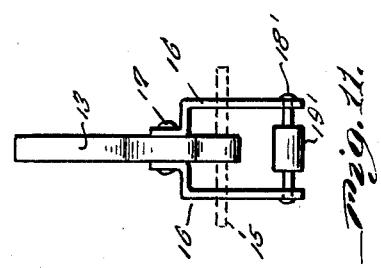
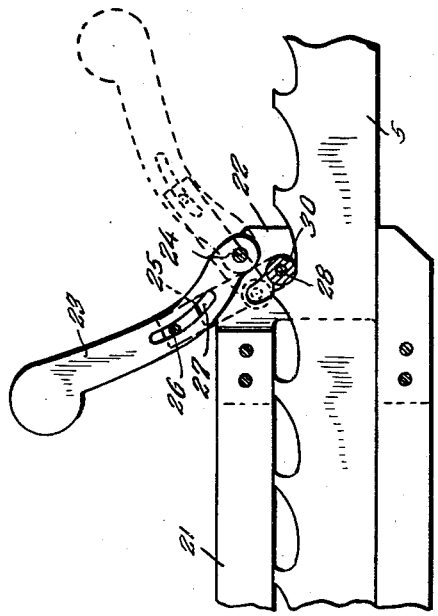
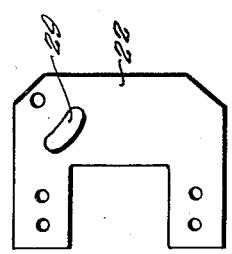
Inventor
E. R. Thomas
By Clarence A. O'Brien
Hyman Berman
Attorneys Patented Oct. 10, 1939

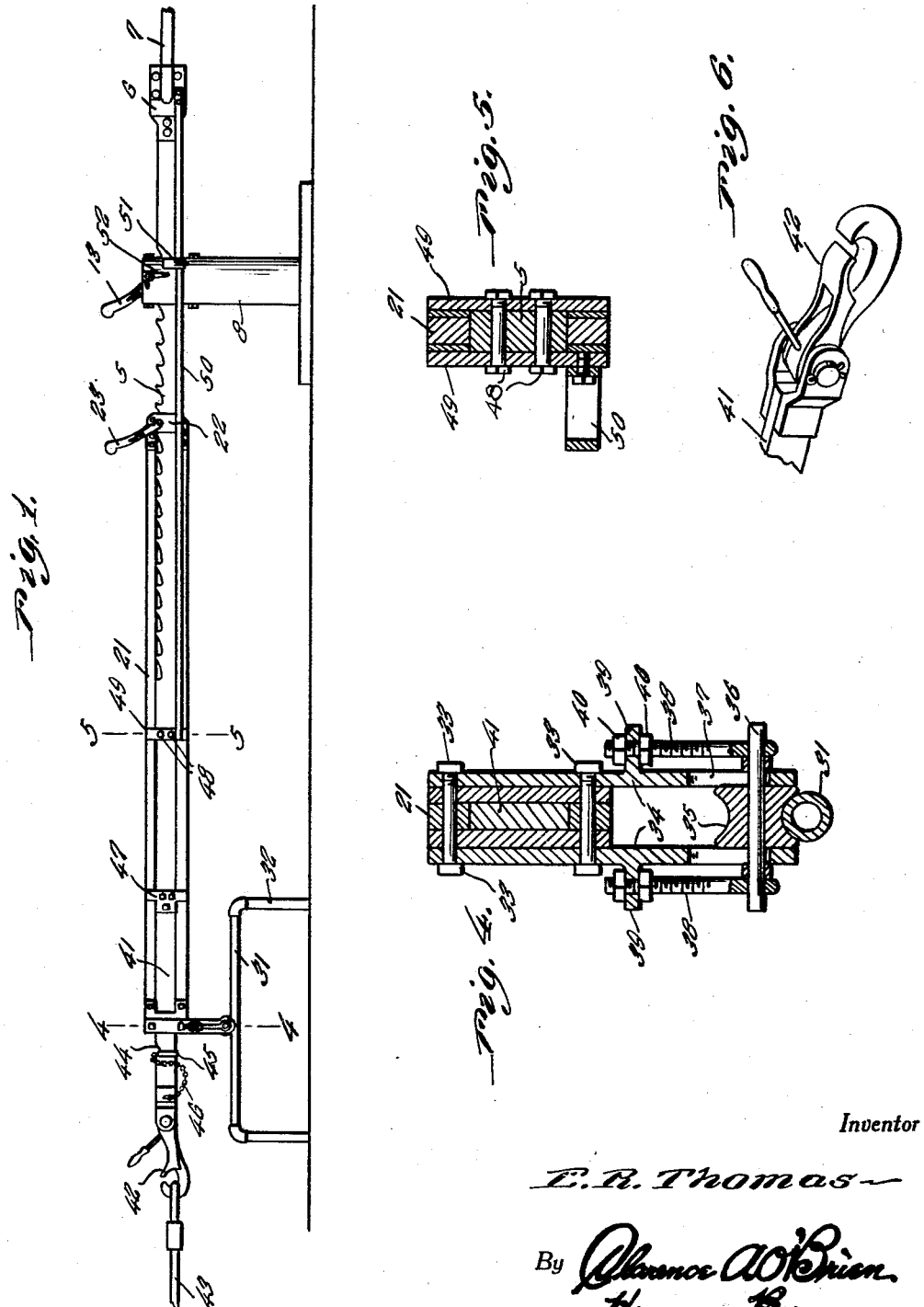

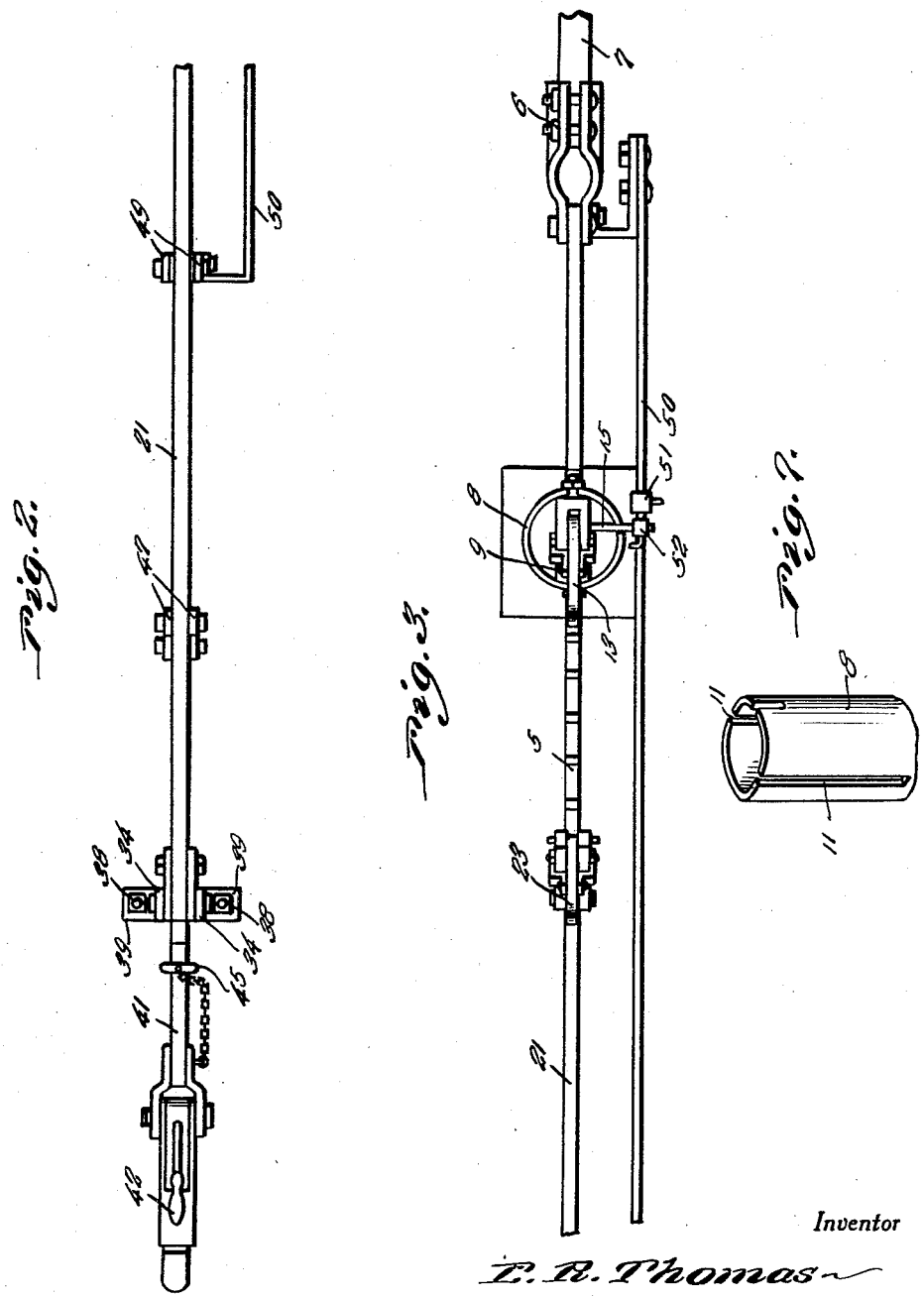

2,175,651

UNITED STATES PATENT OFFICE 2,175,651

SURFACE ROD LINE JACK

Elmer R. Thomas, Alma, Okla., assignor of fifty per cent to X. L. Minnich, Clemscot, and one-half to S. R. Ellis, Duncan, Okla.

Application January 25, 1938, Serial No. 186,875

5 Claims. (Cl. 74—593)

This invention relates to well pumping apparatus and has particular relation to power surface rod line jacks for connecting the rod line with the power pull rod.

Among the objects of the invention is to provide a jack by means of which connection may be quickly and easily controlled, and stroke adjustments made in a positive, efficient and somewhat progressive manner; the invention together with its objects and advantages being best understood from a study of the following description taken in connection with the accompanying drawings wherein:

Figure 1 is a side elevational view of the surface rod line jack.

Figure 2 is a fragmentary top plan view of the jack at the power connection end thereof.

Figure 3 is a similar view of the jack at the rod line end thereof.

Figures 4 and 5 are detail sectional views taken substantially on the lines 4—4 and 5—5 respectively of Fig. 1.

Figure 6 is a perspective view of a safety hook.

Figure 7 is a fragmentary perspective view of the upper end portion of a knock-off post.

Figure 8 is a fragmentary detail view partly in section and partly in elevation of a locking pawl assembly.

Figure 9 is a fragmentary detail view partly in section and partly in elevation of a second locking pawl assembly.

Figure 10 is an elevational view of a plate forming part of the pawl assembly shown in Fig. 8.

Figure 11 is an elevational view of a pawl and

Figure 12 is a side elevational view of a knock-off block.

Referring to the drawings by reference numeral it will be seen that in the preferred embodiment thereof the rod line jack comprises a rack bar 5 that at one end thereof is equipped with a clamp 6 through the medium of which the rack bar is connected with the rod line 7.

The rack bar 5 is supported for movement in a horizontal plane through the medium of a knock-off post 8 in the upper end of which is secured for vertical adjustment therein a knock-off block 9.

The block 9 has threaded studs 10 projecting from opposite sides thereof and accommodated within vertical slots 11 provided therefor in the upper end of the knock-off post 8. Nuts 12 are threadedly engaged with the studs 10 to bind against the knock-off post 8 whereby to secure the block 9 at the desired position of vertical adjustment.

Carried by the block 9 is a lock pawl which includes a lever 13 pivoted at one end within an opening 14 in the top of the block 9 through the medium of a rod 15. A two-part yoke 16 has the legs thereof at one end connected through the medium of a bolt 17 that is accommodated within an arcuate slot 18 provided in the lever 13. The legs of the yoke 16 straddle the knock-off block 9 and at the ends thereof remote from the bolt or rivet 17 the legs of the yoke are connected by a bolt or rivet 18' the end portions of which work in arcuate slots 19 provided in the block 9 at opposite sides of a through slot or opening 20 that accommodates the rack bar 5. On the bolt or rivet 18' is a roller 19' that is engageable with the teeth or notches of the rack bar 5 in a manner clearly shown in Fig. 9 when it is desired to lock the bar 5 against movement toward the right in Figs. 1 and 9.

To free the rack bar 5 lever 13 is swung to the dotted line position shown in Fig. 9 whereby the parts associated with the lever are also swung to the dotted line position shown in Fig. 9 for placing the roller 19' out of engagement with the rack bar 5. As lever 13 is swung to the right in Figure 9 the yoke 16 swings with it until the limbs of the yoke strike the extended ends of the pin 15, see Figure 11, and then this pin acts as a fulcrum for the yoke so that further movement to the right of lever 13 will lower the front end of the yoke which is connected with the lever and raise the other end, as the yoke rocks on the pin 15 and thus the roller 19' will be raised.

Slidable on the rack bar 5 is an elongated frame 21 and at one end thereof the frame 21 is provided with a pair of spaced parallel plates 22 which provide a support for a second locking pawl assembly. This second locking pawl assembly also embodies a lever 23 which at one end is pivoted between the plates 22 as at 24. A yoke 25 has the bolt 26 connecting the legs of the yoke at one end thereof accommodated within an arcuate slot 27 provided therefor in the lever 22. The legs of the yoke 25 straddle the plates 22 and are connected by a bolt or rivet 28 the ends of which are accommodated in arcuate slots 29 provided therefor in the plates 22. The bolt or rivet 28 extends between the plates 22 and mounted thereon is a roller 30 engageable with the teeth or notches in the rack bar as also shown in Fig. 8 whereby to lock the frame 21 and rack bar 5 together for reciprocatory movement as a unit.

To release frame 21 from rack bar 5 so as to permit movement of these elements relative to one another lever 23 together with the associated parts are swung to the position suggested by broken lines in Fig. 8 resulting in a movement of the roller 30 out of engagement with the rack bar 5. As lever 23 is moved to the right in Figure 8, the yoke 25 rocks on the ends of pin 24 to raise the roller 30, this operation being the same as that of the parts shown in Figure 9 for imparting lifting movement to roller 19' by movement of the lever 13 to the right in Figure 9.

At the power hook-up end thereof the frame 21 is supported through the medium of a guide bar 31 supported between standards 32. On said end of the frame 21 are bolted or otherwise secured as at 33 legs 34 between which is supported for vertical adjustment relative thereto a grooved roller or wheel 35 that rides on the guide member 31.

As shown in Fig. 4 the axle for the wheel 35, which axle is indicated by the reference numeral 36 is accommodated within slots 37 provided in the lower end portion of the legs 34, and for adjusting the axle 36 longitudinally of the legs 34 there are provided eye bolts 38 which receive in the eyes thereof the ends of the axle 36. The shanks of the eye bolts 38 extend through apertured lugs 39 provided on the legs 34 and are equipped with upper and lower jam nuts 40 as shown.

Thus it will be seen that by proper adjustment of roller 35 and knock-off block 9 rack bar 5 and frame 21 may be supported at the desired position of elevation.

The frame 21 slidably accommodates in the power hook-up end thereof a bar or rod 41 which at one end is provided with a safety hook 42 through the medium of which the rod 41 is detachably connected with the power line 43.

Intermediate its end the member 41 is provided with a notch 44 that accommodates the bight of a U-bolt 45 straddling the member 41 and adapted to abut the power hook-up end of the frame 21 on each power stroke of the member 41. To guard against loss of the U-bolt 45 the same is secured to the member 41 through the medium of a chain 46.

For guiding the member 41 in its movement longitudinally of the frame 21 said member 41 at opposite sides thereof has bolted or otherwise secured thereto guide plates 47 that laterally engage the upper and lower members of the frame 21 as clearly shown in Fig. 1. The plates 47 also act to engage the outer end of the frame 21 to impart movement to the frame 21 on the return stroke of the member 41.

For substantially the same purpose the rack bar 5 has bolted or otherwise secured thereto as at 48 plates 49 that laterally engage the upper and lower members of the frame 21 at opposite sides of the latter.

For automatically releasing the pawl 19' upon completion of the adjustment of members 5 and 21 relative to one another and the locking of these members together through the medium of the pawl 30 there is mounted on one side of the bar 5 a rod 50 on which is secured at the desired adjustment a trip block 51. In this connection it will be noted that the pivot rod 15 for the lever 13 extends laterally beyond the knock-off post 8 and is provided with a depending trigger 52 arranged in the path of the trip lock 51 so that when the block 51 moves into engagement with trigger 52 rod 15 will be caused to rotate for swinging the pawl lever 13 and associated parts from the full line position shown in Fig. 9 to the dotted line position shown in said figure whereby the rack bar 5 is free to reciprocate back and forth through the knock-off block 9.

Thus it will be seen that with this device on each power stroke of the member 41 frame 21 will be shifted longitudinally of the bar 5 one notch, and on each return stroke of the member 41 bar 5 and frame 21 will move the distance of one notch towards the left through the post 8, this operation continuing until the lug 51 moves into engagement with the trigger 52 whereupon bar 5 will be free to reciprocate back and forth, and with pawl 30 serving to lock the members 5 and 21 together drive is transmitted through the jack from the power line 43 to the rod line 7.

Thus it will be seen that with a rod line jack embodying the features of the present invention provision for the adjustment for control of the stroke is provided for which will insure the adjustment or controlling of the stroke in a positive and efficient manner, the jack not taking up the stroke for transmitting power from the power line to the rod line until after the proper adjustment of the members 5 and 21 relative to one another has been made.

It also will be apparent that through the medium of the locking pawl assembly 19' rack bar 5 may be held substantially stationary while with the pawl assembly 16 released frame 21 is free to slide freely along the rack bar.

Attention is called to the fact that on the forward stroke of the member 41, frame 21 is not moved until the U-shaped member 45 strikes the outer end of the frame 21 and then the frame 21 moves with the member 41. On the return stroke the frame 21 does not move until the plates 47 on member 41 strikes the end of the frame 21 and then the frame 21 will move with the member 41. This enables the pick-up to be controlled. For instance, the power push rod 43 has a thirty inch stroke so that when the rod 43 moves forwardly, it will move member 41, twenty-six inches, and then the member 45 will contact the outer end of the frame 21, after which, the frame 21 will be moved four inches, which will cause roller 30 to move out of one notch and drop into the next notch of rack bar 5. The rod 43 then starts on its return movement and on this return movement, the member 41 will slide free in the frame 21 for twenty-six inches. Then the plates 47 will engage the outer end of the frame 21 and then the entire jack line will be moved four inches to the left in Fig. 1. This repeats over and over, the well picking up four inches each complete stroke of the bar, until the parts reach the proper pumping position.

Then the member 51 contacts the member 52 to throw the pawl 19' out of engagement with the rack bar 5. Then the well member is hooked on and pumping starts. All this occurs automatically and the operator can stand back a safe distance. When the well is not pumping, the device can be released from the operating rod 43 by means of the hook 42.

Attention is also called to the specific arrangement of the notches in the rack bar 5 for it will be seen that these notches are of considerable length and the bottom of each notch is provided with a long curved wall. This form of notch permits expansion and contraction of the rods due to temperature changes and either the roller 19' or the roller 30 will roll back to its catching position from any part of the wall. These rollers work automatically while the well is being picked up or let down, and the operator can stand off at a safe distance.

It is thought that a clear understanding of the construction utility operation and advantages of a surface rod line jack embodying the features of the present invention will be had without any more detailed description.

What is new is:

1. In a surface rod line jack, a supporting member, a rack bar slidably supported by said member and adapted to have one end connected to the rod line, latch means carried by the supporting member and having a part engaging the rack teeth for preventing movement of the rack bar towards the well but permitting movement of the rack bar in an opposite direction, a frame slidably arranged on the rack bar, latch means carried by the frame and engaging the teeth of the rack bar, the last-mentioned latch means locking the frame to the rack bar when the frame is moved away from the well, but permitting movement of the frame relative to the rack bar when the frame is moved in an opposite direction, a bar sliding in the outer end of the frame and connected with the power rod and projections on the last mentioned bar and engaging the outer end of the frame for causing the frame to move with the last-mentioned bar after said bar has moved a certain distance in either direction, and means for releasing the first-mentioned latch means after the rack bar has been moved a certain distance away from the well.

2. In a surface rod line jack, a supporting member, a rack bar slidably supported by said member and adapted to have one end connected to the rod line, latch means carried by the supporting member and having a part engaging the rack teeth for preventing movement of the rack bar towards the well but permitting movement of the rack bar in an opposite direction, a frame slidably arranged on the rack bar, latch means carried by the frame and engaging the teeth of the rack bar, the last-mentioned latch means locking the frame to the rack bar when the frame is moved away from the well, but permitting movement of the frame relative to the rack bar when the frame is moved in an opposite direction, a bar sliding in the outer end of the frame and connected with the power rod and projections on the last-mentioned bar and engaging the outer end of the frame for causing the frame to move with the last-mentioned bar after said bar has moved a certain distance in either direction, means for releasing the first-mentioned latch means after the rack bar has been moved a certain distance away from the well, the teeth of the rack bar being formed by notches of considerable length with the wall of each notch curving upwardly and outwardly from the edge of one tooth to the end of the next tooth, each latch means including a roller for engaging the teeth and the walls of the notches and means for supporting the roller for sliding movement.

3. In a surface rod line jack, a supporting member, a rack bar slidably supported by said member and adapted to have one end connected to the rod line, latch means carried by the supporting member and having a part engaging the rack teeth for preventing movement of the rack bar towards the well but permitting movement of the rack bar in an opposite direction, a frame slidably arranged on the rack bar, latch means carried by the frame and engaging the teeth of the rack bar, the last-mentioned latch means locking the frame to the rack bar when the frame is moved away from the well, but permitting movement of the frame relative to the rack bar when the frame is moved in an opposite direction, a bar sliding in the outer end of the frame and connected with the power rod and projections on the last-mentioned bar and engaging the outer end of the frame for causing the frame to move with the last-mentioned bar after said bar has moved a certain distance in either direction, means for releasing the first-mentioned latch means after the rack bar has been moved a certain distance away from the well, the teeth of the rack bar being formed by notches of considerable length with the wall of each notch curving upwardly and outwardly from the edge of one tooth to the end of the next tooth, each latch means including a roller for engaging the teeth and the walls of the notches and means for supporting the roller for sliding movement, said supporting means including a shaft for the roller, arcuate-shaped slots in the latch supporting means through which the shaft extends, a yoke carrying the shaft, a lever having a slot therein and a pivot for the upper end of the yoke passing through the slot of the lever.

4. In a surface rod line jack, a supporting member, a rack bar slidably supported by said member and adapted to have one end connected to the rod line, latch means carried by the supporting member and having a part engaging the rack teeth for preventing movement of the rack bar towards the well but permitting movement of the rack bar in an opposite direction, a frame slidably arranged on the rack bar, latch means carried by the frame and engaging the teeth of the rack bar, the last-mentioned latch means locking the frame to the rack bar when the frame is moved away from the well, but permitting movement of the frame relative to the rack bar when the frame is moved in an opposite direction, a bar sliding in the outer end of the frame and connected with the power rod and projections on the last-mentioned bar and engaging the outer end of the frame for causing the frame to move with the last-mentioned bar after said bar has moved a certain distance in either direction, means for releasing the first-mentioned latch means after the rack bar has been moved a certain distance away from the well, means associated with the supporting means for adjusting the rack bar vertically, a roller support for the outer end of the frame, and means for adjusting said roller support vertically.

5. In a surface rod line jack, a supporting member, a rack bar slidably supported by said member and adapted to have one end connected to the rod line, latch means carried by the supporting member and having a part engaging the rack teeth for preventing movement of the rack bar towards the well but permitting movement of the rack bar in an opposite direction, a frame slidably arranged on the rack bar, latch means carried by the frame and engaging the teeth of the rack bar, the last-mentioned latch means locking the frame to the rack bar when the frame is moved away from the well, but permitting movement of the frame relative to the rack bar when the frame is moved in an opposite direction, a bar sliding in the outer end of the frame and connected with the power rod and projections on the last-mentioned bar and engaging the outer end of the frame for causing the frame to move with the last-mentioned bar after said bar has moved a certain distance in either direction, means for releasing the first-mentioned latch means after the rack bar has been moved a certain distance away from the well, and means for detachably connecting the power rod to the sliding bar.

ELMER R. THOMAS.